(12) United States Patent
Song et al.

(10) Patent No.: US 11,140,569 B2
(45) Date of Patent: Oct. 5, 2021

(54) METHOD AND RADIO NODE FOR HANDLING CSI REPORTING

(71) Applicant: Telefonaktiebolaget LM Ericsson (publ), Stockholm (SE)

(72) Inventors: Xinghua Song, Beijing (CN); Shaohua Li, Beijing (CN); Zhiheng Guo, Beijing (CN); Rui Fan, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 81 days.

(21) Appl. No.: 16/740,616

(22) Filed: Jan. 13, 2020

(65) Prior Publication Data

US 2020/0154300 A1    May 14, 2020

Related U.S. Application Data

(63) Continuation of application No. 16/249,189, filed on Jan. 16, 2019, now Pat. No. 10,575,202, which is a
(Continued)

(51) Int. Cl.
*H04W 24/10* (2009.01)
*H04L 5/00* (2006.01)
(Continued)

(52) U.S. Cl.
CPC .......... *H04W 24/10* (2013.01); *H04B 17/309* (2015.01); *H04L 1/0026* (2013.01);
(Continued)

(58) Field of Classification Search
None
See application file for complete search history.

(56) References Cited

U.S. PATENT DOCUMENTS 8,989,114 B2    3/2015  Kim et al.
9,306,720 B2    4/2016  Takada et al.
(Continued)

FOREIGN PATENT DOCUMENTS

JP    2012-235352 A    11/2012
JP    2013-527644 A    6/2013
(Continued)

OTHER PUBLICATIONS

International Search Report for PCT International Application No. PCT/SE2014/050942 (dated Dec. 1, 2014).
(Continued)

*Primary Examiner* — Brian S Roberts
(74) *Attorney, Agent, or Firm* — Sage Patent Group

(57) ABSTRACT

A radio node and a UE are described, and methods and computer programs therein to handle separate aperiodic CSI reports for one or more static subframes, in which the direction of signal transmission is fixed, and one or more flexible subframes, in which the direction of signal transmission is variable. The method performed by a UE comprises receiving a trigger for an aperiodic CSI report as part of an uplink grant from a radio node in a static downlink subframe, said trigger indicating a CSI subframe set related to the one or more static subframes. The method further comprises reporting to the radio node, in a CSI reporting subframe, a result of an aperiodic CSI measurement for a CSI reference in the CSI subframe set. The method further comprises receiving a second trigger that relates to the one or more flexible subframes and reporting the results to the radio node.

20 Claims, 5 Drawing Sheets

Related U.S. Application Data continuation of application No. 15/589,455, filed on May 8, 2017, now Pat. No. 10,251,081, which is a continuation of application No. 14/910,611, filed as application No. PCT/SE2014/050942 on Aug. 15, 2014, now Pat. No. 9,680,581, which is a continuation of application No. PCT/CN2013/081556, filed on Aug. 15, 2013.

(51) Int. Cl.

| | | |
|---|---|---|
| *H04L 1/00* | (2006.01) | |
| *H04B 17/309* | (2015.01) | |
| *H04W 72/04* | (2009.01) | |
| *H04W 24/08* | (2009.01) | |
| *H04W 72/14* | (2009.01) | |

(52) U.S. Cl.
CPC .............. *H04L 1/0027* (2013.01); *H04L 5/00* (2013.01); *H04L 5/0057* (2013.01); *H04W 24/08* (2013.01); *H04W 72/0446* (2013.01); *H04W 72/14* (2013.01); *H04L 5/001* (2013.01); *H04L 5/0035* (2013.01); *H04W 72/042* (2013.01)

(56) References Cited

U.S. PATENT DOCUMENTS

| | | | |
|---|---|---|---|
| 2012/0082049 A1 | 4/2012 | Chen et al. | |
| 2013/0077514 A1* | 3/2013 | Dinan | H04L 5/0057 370/252 |
| 2013/0083753 A1 | 4/2013 | Lee et al. | |
| 2013/0121270 A1* | 5/2013 | Chen | H04L 1/0028 370/329 |
| 2013/0194931 A1 | 8/2013 | Lee et al. | |
| 2013/0286933 A1 | 10/2013 | Lee et al. | |
| 2013/0301560 A1 | 11/2013 | Geirhofer et al. | |
| 2014/0133418 A1* | 5/2014 | Takeda | H04L 5/0053 370/329 |

FOREIGN PATENT DOCUMENTS

| | | |
|---|---|---|
| WO | WO 2012/096394 A1 | 7/2012 |
| WO | WO 2012/167431 A1 | 12/2012 |
| WO | WO 2013/093786 A2 | 6/2013 |
| WO | WO 2014/007599 A1 | 1/2014 |
| WO | WO 2014/186943 A1 | 11/2014 |

OTHER PUBLICATIONS

Written Opinion of the International Searching Authority for PCT International Application No. PCT/SE2014/050942 (dated Dec. 1, 2014).
Written Opinion of the International Preliminary Examining Authority for PCT International Application No. PCT/SE2014/050942 (dated Oct. 1, 2015).
International Preliminary Report on Patentability for PCT International Application No. PCT/SE2014/050942 (dated Dec. 1, 2015).
Ericsson et al., "On CSI enhancements for Dynamic TDD", Document for: Discussion, Decision, Agenda Item: 6.2.3.2, 3GPP TSG-RAN WG1 #73, R1-132027, Fukuoka, Japan, May 20-24, 2013, 3 pp.
LG Electronics, "CSI Measurement and Report for TDD eIMTA", Document for: Discussion and Decision, Agenda Item: 7.2.3.1, 3GPP TSG RAN WG1 Meeting #74, R1-133364, Barcelona, Spain, Aug. 19-23, 2013, 5 pp.
Renesas Mobile Europe Ltd., "CSI measurement and reporting in TDD eIMTA", Agenda Item: 7.2.3.1, Document for: Discussion and Decision, 3GPP TSG RAN WG1 Meeting #74, R1-133237, Barcelona, Spain, Aug. 19-23, 2013, 3 pp.
Panasonic, "Downlink measurement set in eIMTA", Agenda Item: 7.2.3.1, Document for Discussion and Decision, 3GPP TSG RAN WG1 Meeting #74, R1-133202, Barcelona, Spain, Aug. 19-23, 2013, 3 pp.
Ericsson et al., "Signalling support for dynamic TDD", Agenda Item: 7.3.3.3, Document for Discussion and Decision, 3GPP TSG RAN WG1 #72, R1-130558, St Julian's, Malta, Jan. 28-Feb. 1, 2013, 3 pp.
3GPP, Technical Specification—"3rd Generation Partnership Project; Technical Specification Group Radio Access Network; Evolved Universal Terrestrial Radio Access (E-UTRA); Physical layer procedures (Release 11)", 3GPP TS 36.213 V11.2.0 (Feb. 2013), 173 pp.
Office Action with English language summary, JP Application No. 2016-533208, (dated Aug. 12, 2016).
Communication with Supplementary European Search Report, EP Application No. 14836686.7 (dated Aug. 22, 2016).
Ericsson et al., "On aperiodic reporting of CSI Processes", Agenda Item: 7.4.5, Document for: Discussion and Decision, 3GPP TSG-RAN WG1 #70bis, R1-124541, San Diego, CA, Oct. 8-12, 2012, 2 pp.
HTC, "Aperiodic feedback to support DL CoMP", Agenda item: 7.5.1.3.2, Document for: Discussion and Decision, 3GPP TSG-RAN WG1 #70, R1-123595, Qingdao, China, Aug. 13-17, 2012, 3 pp.
Non-Final Office Action for U.S. Appl. No. 14/910,611 (dated Nov. 23, 2016).
Ericsson et al., "On CSI enhancements for Dynamic TDD", Agenda Item: 7.2.3.1, Document for Discussion and Decision, 3GPP TSG RAN WG1 #72bis, R1-131456, Chicago, USA, Apr. 15-19, 2013, 3 pp.

\* cited by examiner

METHOD AND RADIO NODE FOR HANDLING CSI REPORTING

CROSS REFERENCE TO RELATED APPLICATIONS

This application is a continuation of U.S. patent application Ser. No. 16/249,189, filed Jan. 16, 2019, which is a continuation of U.S. patent application Ser. No. 15/589,455, filed May 8, 2017, now U.S. Pat. No. 10,251,081, which is a continuation of U.S. patent application Ser. No. 14/910,611, filed Feb. 5, 2016, now U.S. Pat. No. 9,680,581, which is a national stage application under 35 U.S.C. § 371 of PCT International Application No. PCT/SE2014/050942, filed on Aug. 15, 2014, which itself is a continuation of PCT International Application No. PCT/CN2013/081556, filed Aug. 15, 2013, the disclosures and contents of which are incorporated by reference herein in their entireties.

TECHNICAL FIELD

The present disclosure relates generally to Channel State Information, CSI, reporting in wireless communication networks, and in particular to methods in a radio node and a User Equipment (UE) and corresponding radio node and UE for handling aperiodic CSI reporting separately for flexible and static subframes.

BACKGROUND

In the field of radio communication in cellular networks, the term "User Equipment, UE" is commonly used and will be used in this disclosure to represent any user-controlled wireless terminal, mobile phone, tablet or device capable of radio communication including receiving downlink signals transmitted from a radio node and sending uplink signals to the radio node. Further, the term "radio node", also commonly referred to as a base station, e-nodeB, eNB, etc., represents any node of a wireless cellular network that can communicate uplink and downlink radio signals with UEs. The radio nodes described here may, without limitation, include so-called macro nodes and low power nodes such as micro, pico, femto, Wifi and relay nodes, to mention some customary examples. Throughout this disclosure, the term "BS" or "eNB" is often used to denote a radio node.

In a cellular network for radio communication, a Time Division Duplex (TDD) configuration of subframes may be used for uplink and downlink transmissions in cells where consecutive subframes are comprised in a repeatable radio frame. The subframes are reserved for uplink transmissions from User Equipments (UEs) to a serving radio node and for downlink transmissions from the radio node to the UEs such that uplink and downlink transmissions do not occur at the same time within the cell. A subframe is basically defined by a preset time period of a certain length, typically 1 millisecond (ms), and each subframe may comprise two time slots of 0.5 ms each. Further, a radio frame comprises a predefined number of consecutive subframes, e.g. ten subframes. In such a network, different radio nodes are able to use different configurations of subframes, e.g. depending on the current need for uplink and downlink radio resources, respectively.

An example of different TDD configurations that can be used by radio nodes in different cells is shown in the table of FIG. 1 comprising seven different TDD configurations 0-6 each having ten subframes 0-9 including downlink subframes "D", uplink subframes "U" and so-called special subframes "S". The special subframes S are configured with one part reserved for downlink, another part reserved for uplink, and a guard period between the two parts allowing neither uplink nor downlink. It can be seen in this example that the first three subframes 0-2 and subframe 5 are reserved for downlink D, special S, uplink U, and downlink D, respectively, in all TDD configurations 0-6, while the remaining subframes 3, 4, 6-9 can vary in different TDD configurations. The latter subframes 3, 4, 6-9 may be referred to as flexible subframes having a variable link direction, and the former subframes 0-2 and 5 may be referred to as static or fixed subframes having a fixed link direction.

In this disclosure, the term "flexible subframe" thus denotes a subframe in which the direction of transmission, i.e. downlink or uplink, may differ between different cells so that the flexible subframe may be used for downlink transmission in one cell and for uplink transmission in another cell. Further, a flexible subframe may differ from one radio frame to another in the same cell so that the flexible subframe is used in the cell for downlink in one radio frame and for uplink in another radio frame. Thereby, transmissions in flexible subframes may, at least in some radio frames, cause interference between different neighboring cells as follows. In this disclosure, the expression "during a flexible subframe" should be understood as in the flexible subframe or in a subframe that overlaps in time with the flexible subframe depending on if the UE is served by the radio node that applies the subframe scheme with the flexible subframe or if the UE is served by a neighboring radio node that applies a subframe scheme with a subframe that overlaps or coincides in time with the flexible subframe.

When different TDD configurations are used in two neighboring cells, interference may occur across the cells during a flexible subframe where downlink is permitted in one cell and uplink is permitted in the other cell at the same time. In this description, the term "neighboring cells" means that they are close enough to one another so that transmissions in one cell can potentially cause interference in the other cell. Interference due to different TDD configurations in neighboring cells can be either 1) downlink to uplink interference when a downlink transmission from a radio node of one cell disturbs an uplink reception in a radio node of the other cell during a flexible subframe, or 2) uplink to downlink interference when an uplink transmission from a UE in one cell disturbs a downlink reception in a UE in the other cell during a flexible subframe. Of these two scenarios, 1) refers to interference between radio nodes which is more or less predictable and this interference can be controlled quite accurately since the radio nodes in the neighboring cells are in fixed positions relatively far away from each other such that the downlink signals from one radio node are not very strong when received in the other radio node.

On the other hand, scenario 2) above refers to interference between UEs which is more unpredictable since the UEs move around and may sometimes be located quite near each other while being served by different radio nodes, e.g. when both are located close to the borders of their respective cells. This scenario is illustrated in FIG. 2 where a first UE denoted by "UE1" is located near the border of a first cell 1 served by a first radio node "BS1" using a TDD configuration allowing the UE1 to transmit uplink signals "UL1" in a certain subframe. At the same time, a second UE "UE2" is located near the border of a second cell 2 served by a second radio node "BS2" using another TDD configuration allowing UE2 to receive downlink signals "DL2" in the same subframe, thus being a flexible subframe in this context.

Since UE1 and UE2 happen to be quite close to one another but relatively far away from their respective radio nodes, the uplink signals UL1 transmitted with high power from UE1 will interfere strongly with the relatively weak downlink signals DL2 received by UE2 during the flexible subframe. This UE to UE interference "I" is illustrated by a dashed arrow.

FIG. 3A shows two examples of TDD configurations which can cause UE to UE interference across neighboring cells 1 and 2. In cell 1, TDD configuration 1 of FIG. 1 is used and in cell 2, TDD configuration 2 of FIG. 1 is used. It can be seen in both FIG. 1 and FIG. 3A that flexible subframes 3 and 8 are configured differently in the two cells such that they are uplink subframes in cell 1 and downlink subframes in cell 2, hence potentially causing UE to UE interference I from cell 1 to cell 2, illustrated by dashed arrows in FIG. 3A. In this case, UE1 can be called an "aggressor UE" and UE2 can be called a "victim UE". Likewise, cells 1 and 2 can be called "aggressor cell" and "victim cell", respectively. It is thus a problem that, in a radio communication network allowing different TDD configurations with one or more flexible subframes in different cells, downlink radio signals received by a victim UE in a victim cell during a flexible subframe, may be subjected to interference caused by an uplink transmission from an aggressor UE in an aggressor cell during that subframe, e.g. depending on the relative distance and locations of the UEs which are typically unpredictable.

In wireless communications, Channel State Information, CSI, refers to channel properties of a radio communication link. This information basically describes how a signal propagates from the transmitter to the receiver. The CSI makes it possible to adapt transmissions to current channel conditions, which may be helpful for achieving reliable communication with high data rates in a cellular network. The CSI needs to be estimated at the receiver, typically the UE, and it is usually quantized and reported back to the transmitter, typically the radio node serving the UE. This report is commonly referred to as CSI feedback. A CSI report may comprise a Channel Quality Indicator, CQI, a Precoding Matrix Indicator, PMI and/or a Rank Indicator, RI.

CSI feedback is typically used to support the performance of a wireless access network in various respects. For example, it is commonly used as a basis for different RRM functionalities such as scheduling, link adaptation as well as interference coordination. It can also be used for rank and precoding matrix recommendations for MIMO transmission. In LTE, two CSI reporting schemes are supported: periodic CSI reporting and aperiodic CSI reporting. The following disclosure relates to aperiodic CSI reporting for a TDD system where fast or flexible UL/DL reconfigurations are employed.

It is expected that wireless data traffic will become more and more localized in the future, where most UE users will be in hotspots, or in indoor areas, or in residential areas. These UE users will thus typically be located in clusters within a limited area of a cell served by a radio node, and the UEs will produce different UL and DL traffic at different times to and from the radio node, respectively. This essentially means that a dynamic feature to adjust the UL and DL resources to instantaneous (or short term) traffic variations would be required in future local area cells. In this case, a TDD system which has the flexibility to dynamically allocate the UL/DL resources depending on current traffic situation becomes very attractive.

As described above, today, there are seven different TDD UL/DL configurations defined in LTE, shown in the table of FIG. 1, providing a range of 40%-90% resources for DL. It can be seen in FIG. 1 that for example TDD configuration 5 has much more resources for DL than, say, TDD configuration 0. In current specification, the UL/DL configuration is semi-statically configured, thus it may not well match the instantaneous traffic situation which may vary quite rapidly. Faster TDD reconfigurations, hereafter referred to as "dynamic TDD", have shown good performance potentials in both UL and DL, especially at low to medium system load, and dynamic TDD will become a standardized feature of LTE Rel-12. It should be noted that more TDD configurations than the ones listed in the table in FIG. 1 may be introduced in the future. The herein suggested solution is not limited to the existing TDD configurations; rather it is equally applicable to new configurations defined in future.

Different signaling methods are being considered to support dynamic TDD reconfigurations with different time scale. Theoretically, each subframe could be allocated as either UL or DL. However, this would pose big challenges to operations like DL/UL switching, random access, radio link monitoring, handover, etc. Moreover, it would be virtually impossible to achieve backward compatibility with legacy UEs. Therefore, it is more practical to dynamically change between UL and DL among a subset of the subframes, e.g. by changing between the different TDD configurations in FIG. 1. In this case, the subframes can be divided into two types: static subframes and flexible subframes. The static subframes have fixed link directions for all TDD configurations, while flexible subframes can be either UL or DL in different TDD configurations, and can thereby be dynamically changed between UL and DL, e.g. by change of TDD configuration for a cell, as described above.

It may be up to the eNB to configure the set of flexible subframes depending on the traffic situation. One possible way is to signal two different UL/DL TDD configurations to a UE, such that the flexible subframes are determined implicitly by the two reference TDD configurations i.e., as said above, the subframes in which the link directions in the two TDD configurations may be different are defined as flexible subframes. FIG. 3B shows an example where reference TDD configuration 0 is used for UL and reference TDD configuration 2 is used for DL. In this example, the static downlink subframes, which may include normal subframes and special subframes, are subframes 0, 1, 5 and 6, while the static uplink subframes are subframe 2 and 7, the subframes 0-2 and 5-7 thus being static subframes with fixed link directions. The remaining subframes 3, 4, 8 and 9 are flexible subframes which can be used for either uplink or downlink transmissions.

Considering UE reception in the two types of subframes, the interference situations may be different in different subframes, e.g. as described above with reference to FIGS. 1-3B. In static DL subframes, the inter-cell interference is generated by neighboring eNB(s), while in flexible subframes the inter-cell interference could either be generated by neighboring eNB(s) or by certain UE(s) served by the neighboring eNB(s) which are currently scheduled for UL transmissions. To deal with the above different interference situations, separate CSI measurements should be employed for the two types of subframes so that DL scheduling as well as link adaptation can be properly performed for both types of subframes on the basis of the respective CSI measurements. Thus, there is a need for mechanisms for handling such separate CSI measurements.

SUMMARY

It is desirable to find methods for handling separate CSI measurements for static and flexible subframes. In this disclosure, a solution is described for triggering a UE to perform aperiodic CSI reporting for static downlink subframes and for flexible downlink subframes separately. This is achieved by methods, nodes, and computer programs as described in the appended independent claims. The solution is robust, easy to implement and introduces very little overhead, and further has low impact on current standardization, e.g. minimizing need for changes.

According to a first aspect, a method is provided, to be performed by a UE, for handling separate aperiodic CSI reports for one or more static subframes, in which the direction of signal transmission is fixed, and one or more flexible subframes, in which the direction of signal transmission is variable. The method comprises receiving a trigger for an aperiodic CSI report as part of an UL grant from a radio node in a static DL subframe. The trigger indicates a CSI subframe set related to the one or more static subframes. The method further comprises reporting to the radio node, in a CSI reporting subframe, a result of an aperiodic CSI measurement for a CSI reference in the CSI subframe set. The method further comprises receiving a second trigger for a second aperiodic CSI report as part of a second UL grant from the radio node in a second static DL subframe, said second trigger indicating a second CSI subframe set that relates to the one or more flexible subframes. The method further comprises reporting to the radio node, in a second CSI reporting subframe, a result of a second aperiodic CSI measurement for a second CSI reference in the second CSI subframe set.

According to a second aspect, a computer program is provided comprising program code containing instructions to be executed by at least one processor of a User Equipment, UE, to handle separate aperiodic channel state information, CSI, reports for one or more static subframes, in which the direction of signal transmission is fixed, and one or more flexible subframes, in which the direction of signal transmission is variable, whereby execution of the program code causes the at least one processor to perform operations comprising receiving a trigger for an aperiodic CSI report as part of an uplink, UL, grant from a radio node in a static downlink, DL, subframe, said trigger indicating a CSI subframe set related to the one or more static subframes. The execution of the program code causes the at least one processor to perform further operations comprising reporting to the radio node, in a CSI reporting subframe, a result of an aperiodic CSI measurement for a CSI reference in the CSI subframe set. The execution of the program code causes the at least one processor to perform further operations comprising receiving a second trigger for a second aperiodic CSI report as part of a second UL grant from the radio node in a second static DL subframe, said second trigger indicating a second CSI subframe set that relates to the one or more flexible subframes. The execution of the program code causes the at least one processor to perform further operations comprising reporting to the radio node, in a second CSI reporting subframe, a result of a second aperiodic CSI measurement for a second CSI reference in the second CSI subframe set.

According to a third aspect, a UE is provided to handle separate aperiodic CSI reports for one or more static subframes, in which the direction of signal transmission is fixed, and one or more flexible subframes, in which the direction of signal transmission is variable. The UE comprises a processor configured to perform operations comprising receiving a trigger for an aperiodic CSI report as part of an UL grant from a radio node in a static DL subframe, said trigger indicating a CSI subframe set related to the one or more static subframes. The processor is configured to perform further operations comprising reporting to the radio node, in a CSI reporting subframe, a result of an aperiodic CSI measurement for a CSI reference in the CSI subframe set. The processor is configured to perform further operations comprising receiving a second trigger for a second aperiodic CSI report as part of a second UL grant from the radio node in a second static DL subframe, said second trigger indicating a second CSI subframe set that relates to the one or more flexible subframes. The processor is configured to perform further operations comprising reporting to the radio node, in a second CSI reporting subframe, a result of a second aperiodic CSI measurement for a second CSI reference in the second CSI subframe set.

According to a fourth aspect, computer program is provided comprising program code containing instructions to be executed by at least one processor of a radio node to handle separate aperiodic Channel State Information, CSI, reports for one or more static subframes, in which the direction of signal transmission is fixed, and one or more flexible subframes, in which the direction of signal transmission is variable, whereby execution of the program code causes the at least one processor to perform operations comprising indicating to a User Equipment, UE, in an uplink, UL, grant in a static downlink, DL, subframe, a first CSI subframe set in which the UE should perform an aperiodic CSI measurement for a first CSI reference resource, where the first CSI subframe sets relates to the one or more static subframes. Execution of the program code causes the at least one processor to perform operations further comprising receiving, in a CSI reporting subframe, a CSI report from the UE comprising a result of the aperiodic CSI measurement for a CSI reference resource in the first CSI subframe set. Execution of the program code causes the at least one processor to perform operations further comprising indicating to the UE, in a second UL grant in a second DL subframe, a second CSI subframe set in which the UE should perform a second aperiodic CSI measurement for a second CSI reference resource, where the second CSI subframe sets relates to the one or more flexible subframes. Execution of the program code causes the at least one processor to perform operations further comprising receiving, in a second CSI reporting subframe, a second CSI report from the UE comprising a result of the second aperiodic CSI measurement for the second CSI reference resource.

According to a fifth aspect, a use of at least one bit in a CSI request field in an UL grant on a PDCCH or ePDCCH is provided for indicating the trigger when the at least one bit is set to a first value and indicating the second trigger when the at least one bit is set to a second value. The at least one bit is decoded to determine whether the at least one bit indicates the trigger or the second trigger.

BRIEF DESCRIPTION OF THE DRAWINGS

The invention will now be described in more detail by means of exemplifying embodiments and with reference to the accompanying drawings, in which.

DETAILED DESCRIPTION

Figures 1, 2:
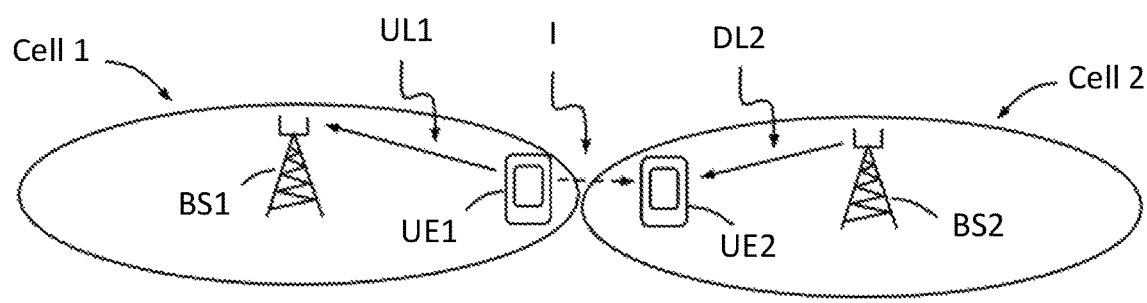
FIG. 1 shows different TDD configurations in LTE.
FIG. 2 shows an exemplifying scenario where interference due to dynamic TDD with different TDD configurations in neighboring cells may occur.
Figure 3A:
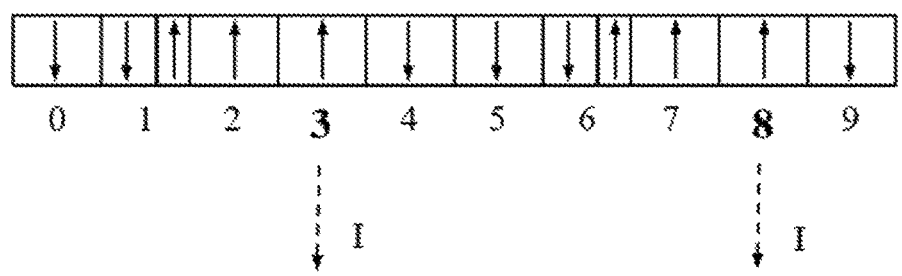
FIG. 3A shows two different TDD configurations, and the possible interference which may occur when used simultaneously in neighboring cells.
Figure 3A:
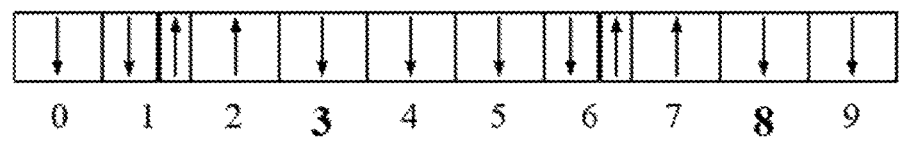
Figure 3B:
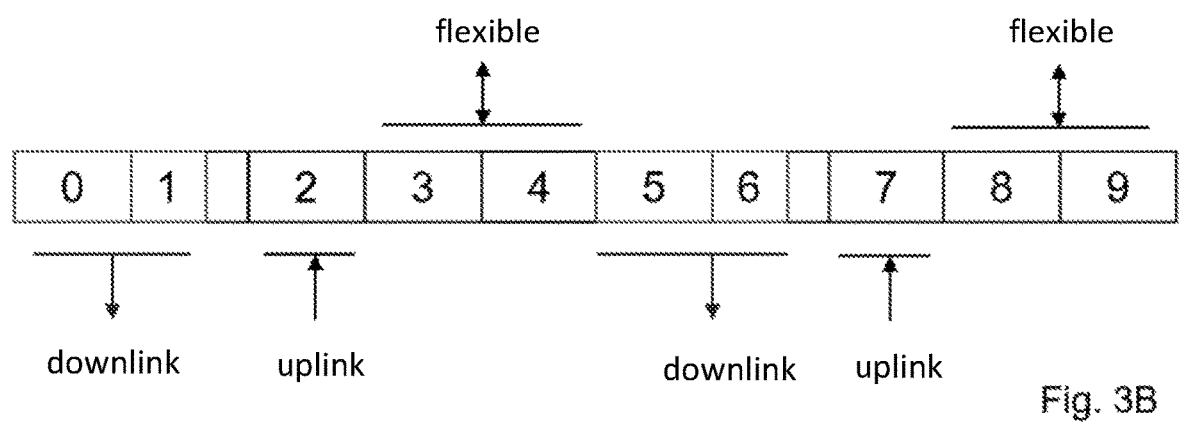
FIG. 3B shows a frame structure of dynamic TDD for UL reference configuration 0 and DL reference configuration 2.

In prior art specification, an aperiodic CSI report is triggered by uplink grants (DCI format 0/4) carried by a Physical Downlink Control Channel, PDCCH, or an Evolved PDCCH, E-PDCCH. If an aperiodic CSI report is triggered in subframe n, a UE shall perform CSI measurements on an implicit CSI reference resource and perform aperiodic CSI reporting using a Physical Uplink Shared CHannel, PUSCH, in subframe n+k, where k is the scheduling timing delay for PUSCH. The CSI is determined for a group of downlink physical resources denoted "CSI reference resource" in 3GPP. For aperiodic CSI reporting, the CSI reference resource corresponds, in the time domain, to the subframe of the corresponding CSI request. That is, the CSI reference resource is implicitly decided by the subframe in which the request for an aperiodic CSI report was sent. In dynamic TDD, UL transmissions in both static subframes and flexible subframes are scheduled by the UL grants sent in static DL subframes. The inventors have realized that there are problems with the current specified request mechanisms for aperiodic CSI schemes for dynamic TDD deployment when the aperiodic CSI measurement and report made by the UE for the static and the flexible downlink subframes should be requested separately.

The reason for transmitting UL grants in static DL subframes is to enable backwards compatibility, and to avoid introduction of new UL scheduling and HARQ timing designs which would entail substantial additional complexity to both eNB and UE. By backwards compatibility is meant e.g. that any UE, irrespective of which DL TDD configuration that is used, should be able to receive the UL grant. Thus, since in prior art the CSI reference resource depends on, and for the time domain in fact is, the DL subframe in which the aperiodic CSI was triggered, it will always be in the same type of subframe, namely a static subframe. This is not compatible with the need to request aperiodic CSI also for flexible subframes, as realized by the inventors.

The inventors have realized that a solution is needed for enabling aperiodic CSI requests for both static and flexible subframes, respectively. It is desirable that this solution introduces as little overhead as possible, is easy to implement, and that it is further favorable if the solution entails a minimum of changes to the current standards.

According to the prior art, there is a possibility to trigger aperiodic CSI reports for different carriers and for different CSI processes. The possibility to trigger a CSI report for different carriers is related to Carrier Aggregation, CA, where a UE may be configured with a number of different carriers, on different radio frequencies, which may require different CSI reporting. The alternative to trigger aperiodic CSI reports for different CSI processes is related to a technique referred to as "Coordinated MultiPoint (CoMP) transmission and reception". A CSI process could be explained as follows: A transmission hypothesis in CoMP is composed of two parts: signal hypothesis and interference hypothesis. The signal hypothesis specifies transmission point(s), TP(s), from which data is assumed to be transmitted, and the interference hypothesis stands for interference suffered during the assumed data transmission. CSI corresponding to one transmission hypothesis is defined as a CSI process. A CSI process is determined by the association of a signal hypothesis and an interference hypothesis, where the signal hypothesis and interference hypothesis are measured through or on CSI-RS and interference measurement resource (IMR), respectively. However, this is not related to different subframe sets comprising either static or flexible subframes.

The inventors have realized that in order to enable separate requesting or triggering of aperiodic CSI reports for static and flexible subframes respectively, a new scheme to address different types of subframes is needed. Below, such a scheme will be described with reference to illustrative drawings. The solution will first be described from the perspective of a UE, and then from the perspective of a radio node, BS or eNB.

In the following description, triggering a UE to perform aperiodic CSI reporting is sometimes referred to e.g. as a "CSI request" or a "CSI report request."

Method for User Equipment, UE

Examples of embodiments of a method performed by a UE, for handling separate aperiodic CSI reports for one or more static subframes, in which the direction of signal transmission is fixed, and one or more flexible subframes, in which the direction of signal transmission is variable, will now be described with reference to a flowchart depicted in FIG. 4. The UE is configured to be operable in a wireless communication system applying dynamic TDD. The method comprises the following actions, which actions may be taken in any suitable order.

Action 401

The UE receives a trigger for an aperiodic CSI report as part of an uplink, UL, grant from a radio node, e.g. a BS, in a static DL subframe. The trigger indicates a CSI subframe set, out of at least two alternative CSI subframe sets. One of the at least two alternative CSI subframe sets relates to the one or more static subframes, and another one of the at least two alternative CSI subframe sets relates to the one or more flexible subframes.

The UL grant, gives permission to the UE to transmit in an UL subframe. The UL grant may be sent in downlink control information, DCI. The term "UL grant" is here considered to encompass also Random Access grants. The received UL grant comprises, in a CSI request field, one or more bits indicating the CSI subframe set. The indicated CSI subframe set may refer to or comprise the one or more static subframes, or, the indicated CSI subframe set may refer to or comprise the one or more flexible subframes. For example, when the trigger or indicator comprises two bits with the value "01" this may be defined to indicate that an aperiodic CSI report is requested for the one or more flexible subframes. Correspondingly, when the two bits have the value "11", this may be defined to indicate that an aperiodic CSI report is requested for the one or more static subframes. The trigger may further take on other values, e.g. "00", which may be defined to indicate that no aperiodic CSI report is requested at this time. The bits in the CSI request field may thus be seen as a trigger that indicates a CSI subframe set for which an aperiodic CSI report is requested. The indication or trigger may be received e.g. over a PDCCH or an E-PDCCH.

In some embodiments, the trigger may further indicate one or more CSI processes.

Action 402

Figure 4:
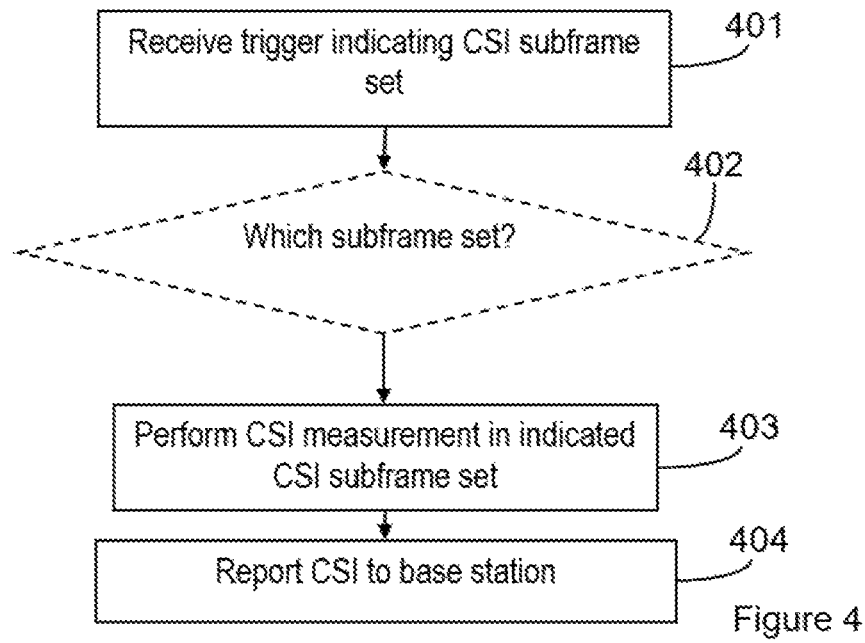
FIG. 4 is a flow chart illustrating a method to be performed by a UE, according to an exemplifying embodiment.

This action may be regarded as implicitly included e.g. in action 403 (and therefore have a dashed outline), but is shown in FIG. 4 to facilitate understanding. When the trigger is received, the trigger needs to be decoded, i.e. the UE needs to determine which type of CSI subframe set that is indicated by the trigger, i.e. if the one or more subframes in the indicated CSI subframe set are flexible or static. This could alternatively be expressed as that the UE needs to determine which trigger, out of a plurality of triggers, that was comprised in the UL grant.

Action 403

The UE performs an aperiodic CSI measurement for a CSI reference resource in the indicated CSI subframe set.

When the trigger indicates, or is determined to indicate, a set of static subframes, i.e. the one or more static subframes, as the CSI subframe set, the CSI measurement will be performed for at least one CSI reference resource in the set of static subframes. Correspondingly, when the trigger indicates, or is determined to indicate, a set of flexible subframes, i.e. the one or more flexible subframes, as the CSI subframe set, the CSI measurement will be performed for at least one CSI reference resource in the set of flexible subframes. The CSI measurement need not be performed on the exact resources defined as the CSI reference resource, but could be performed on radio resources corresponding to or representing the CSI reference resource. In other words, the CSI measurement should represent a measurement performed on the CSI reference resource. The CSI reference resources for the different CSI subframe sets could be predefined, such that both the UE receiving the indication or trigger and the radio node sending the indication or trigger agree on, i.e. have a common understanding on, which resources that are the CSI reference resource for each respective CSI subframe set. The UE and radio node should further agree on the definition of the trigger, which could also be predefined. This information on trigger and CSI reference resources could be provided to the UE and/or radio node as part of a setup procedure, and/or e.g. be otherwise communicated or updated from a management node to the radio node and from the radio node to the UE, e.g. via RRC signaling. How the CSI reference resource may be defined will be described in more detail further below.

Action 404

The UE reports a result of the CSI measurement to the radio node.

The CSI measurement result is processed by the UE, and the result is presented to the radio node in an aperiodic CSI report. The report is transmitted in an UL subframe, which may be defined by the trigger, or be implicitly linked to the subframe in which the aperiodic CSI report was triggered. For example, the report may be transmitted in a CSI reporting subframe n, where n is a subframe index.

In some embodiments, when the indicated CSI subframe set relates to the one or more flexible subframes, the CSI reference resource is defined, in the time domain, as a single downlink subframe $n-n_{CQI\_ref}$, where $n_{CQI\_ref}$ is an offset such that the single downlink subframe is a valid downlink subframe belonging to the indicated CSI subframe set, and where n is the subframe index for the CSI reporting subframe.

Method for Radio Node, e.g. BS

Embodiments of the method will now be described seen from the perspective of a radio node, e.g. a BS. The radio node or BS could in some embodiments be an eNB. Thus, examples of embodiments of a method performed by a radio node for handling separate aperiodic CSI reports for one or more static subframes, in which the direction of signal transmission is fixed, and one or more flexible subframes, in which the direction of signal transmission is variable will now be described with reference to a flowchart depicted in FIG. 5. The method comprises the following actions, which may be performed in any suitable order:

Action 501

This action may be considered to be implicitly included e.g. in action 503, but is schematically illustrated here to facilitate understanding. For this reason the action is outlined with a dashed line. The action could be described as the radio node determines whether there is a need for an aperiodic CSI report from a UE. When there is, an aperiodic CSI report request is to be transmitted to the UE as part of DL control information, as previously described.

Action 502

As for action 501, this action may also be considered to be implicitly included in action 503 or in action 501. The action could be described as to determine whether an aperiodic CSI report is needed for flexible subframes/resources or for static subframes/resources. This could be determined in association with determining the possible need for requesting an aperiodic CSI report e.g. in action 501.

Action 503

The radio node indicates to a UE, in an UL grant in a static DL subframe, a CSI subframe set, out of at least two alternative CSI subframe sets, in or upon which the UE should perform CSI measurements for a CSI reference resource, where one of the at least two alternative CSI subframe sets relates to, e.g. refers to or comprises, the one or more static subframes, and another one of the at least two alternative CSI subframe sets relates to, e.g. refers to or comprises, the one or more flexible subframes.

When it is clear that there is a need for an aperiodic CSI report for a certain type of subframe, flexible or static, a request for such a report is to be signaled from the radio node to the UE. That is, such a report should be triggered by the radio node. The action could alternatively be formulated as that a report is requested by use of an indicator or trigger. The indicator, or trigger, comprises at least one bit, and different values of the at least one bit, such as "01", "10" or "11" may be referred to as different triggers indicating different CSI subframe sets, e.g. the one or more static subframes or the one or more flexible subframes, and being linked to different CSI reference resources depending on what CSI subframe set is indicated.

In some embodiments the indicating may further comprise indicating one or more CSI processes to the UE.

Action 504

The radio node receives a CSI report from the UE in the indicated CSI subframe set. The CSI report comprises a result of the aperiodic CSI measurement.

The CSI report is received in response to the aperiodic CSI report request comprising the indication or trigger as described above. When the trigger indicates a CSI subframe set of flexible subframes, the CSI report will relate to a CSI reference resource in one or more flexible subframes. Correspondingly, when the trigger indicates a CSI subframe set of static subframes, the CSI report will relate to a CSI reference resource in one or more static subframes. The CSI report is received in an UL subframe n, which may be implicitly known and depend on the subframe in which the CSI report was requested. The UL subframe n is thus the CSI reporting subframe where the CSI report that comprises the result of the aperiodic CSI measurement indicated by the CSI subframe set is received at the radio node.

In some embodiments, when the indicated CSI subframe set relates to the one or more flexible subframes, the CSI reference resource is defined, in the time domain, as a single downlink subframe $n-n_{CQI\_ref}$, where $n_{CQI\_ref}$ is an offset such that the single downlink subframe is a valid downlink subframe belonging to the indicated CSI subframe set, and where n is the subframe index for the CSI reporting subframe.

CSI Reference Resources

When the UE receives a trigger for an aperiodic CSI measurement and report according to the above, the UE should measure a signal representing or corresponding to a signal transmitted on a CSI reference resource, e.g. in terms of channel measurement and/or interference measurement, and further determine a CSI from the measurement. The CSI reference resource is a frequency-time resource for which the UE should determine CSI. The CSI is then reported to the radio node and used by the radio node e.g. for scheduling in corresponding resources, as previously described.

In an exemplifying embodiment of the method described above, the CSI reference resource for the flexible subframes, i.e. the flexible subframe set, may be defined as follows:

In the time domain, the CSI reference resource may be defined e.g. as a single downlink subframe $n-n_{CQI\_ref}$, where $n_{CQI\_ref}$ is the time offset between the CSI reporting subframe n, and the single downlink subframe, also denoted CSI reference resource subframe, where $n_{CQI\_ref}$ should be such that the CSI reference resource is in a valid downlink subframe belonging to the set of flexible subframes.

$n_{CQI\_ref}$ may be configured, and thus known to the UE and radio node, as part of a setup procedure, and/or be provided or updated as part of control signaling, e.g. RRC signaling, In the frequency domain, the CSI reference resource may be defined as the group of downlink physical resource blocks corresponding to the band to which a derived CQI value relates.

In the embodiments above, one or more bits may be added in downlink control information, DCI, to trigger the UE to perform CSI measurements and deliver an aperiodic CSI report for a fixed, i.e. static, subframe or for a flexible subframe. Alternatively, one or more existing bits in DCI may be used to trigger the UE to perform CSI measurements and deliver an aperiodic CSI report for a fixed, i.e. static, subframe or for a flexible subframe. For example, when an added or existing bit in the DCI is set to 1 (or 0) it may be a trigger for an aperiodic CSI report for a fixed, i.e. static, subframe, and when this bit in the DCI is set to 0 (or 1) it may be a trigger for an aperiodic CSI report for a flexible subframe. A combination of one or more existing bits and one or more added bits may also be used for triggering different aperiodic CSI reports.

In case of carrier aggregation, when a UE is associated with at least two carriers, the aperiodic CSI request field in UL grants comprises two bits. Similarly, for UEs applying CoMP, which are configured with a plurality of CSI processes, the aperiodic CSI request field, or CSI information field, in UL grants comprises two bits. However, for UEs configured with one carrier and only one CSI process, the aperiodic CSI request field in UL grants comprises only one bit. For such single carrier, single CSI process UEs, the aperiodic CSI request field could be updated to comprise more than one bit, e.g. two bits. For UEs where the aperiodic CSI request field already comprises more than one bit, these bits could be re-used and redefined.

Some potential advantages that may be achieved by implementing the solution according to any of the above-described embodiments include improved performance and/or capacity in the cellular network since UEs are enabled to provide more accurate and useful CSI reports when dynamic TDD with both static and flexible subframes is employed. The UEs can be triggered to perform the CSI reporting in a simple manner and with a minimum of signaling overhead. Implementing the solution will also have very low impact on the standard, e.g. minimizing standard changes.

Embodiments of Nodes

Below, implementations of a UE and a radio node, e.g. BS, will be described with reference to FIGS. 6-9. The UE and radio node are configured to perform at least a respective one of the methods described above with reference to FIGS. 4-5. The nodes will be described in brief in order to avoid unnecessary repetition.

User Equipment, UE

Embodiments described herein also relate to a UE, operable in a wireless communication system. The UE is configured to perform at least one embodiment of the method performed by a UE described above. The UE is associated with the same technical features, objects and advantages as the method described above and illustrated e.g. with reference to FIG. 4.

Figure 6:
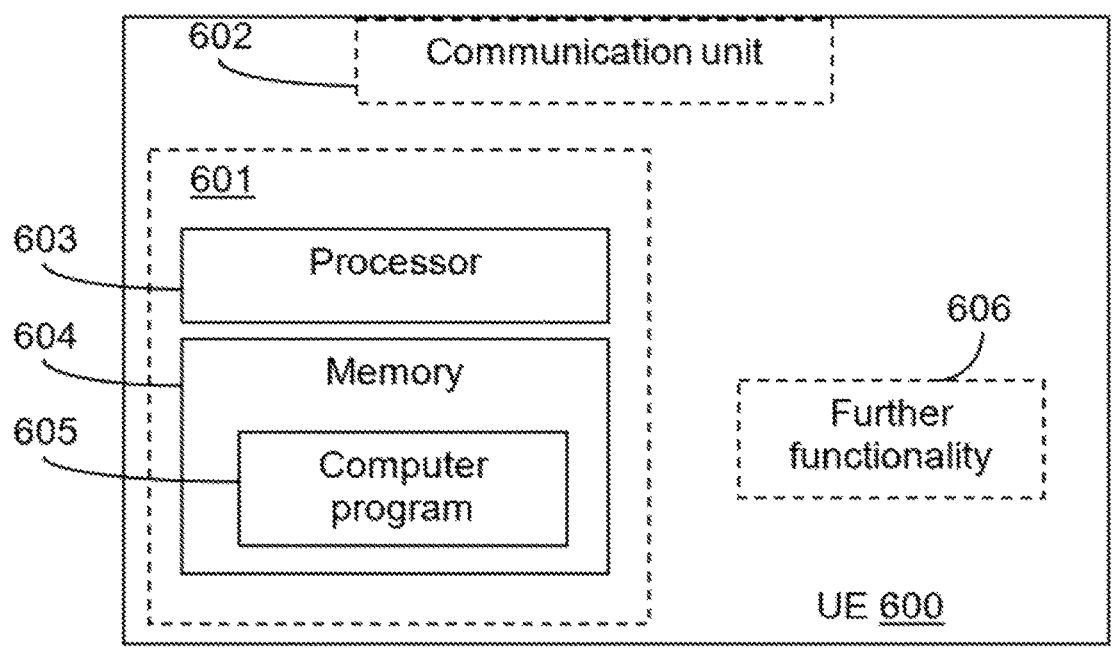
FIGS. 6 and 7 are block schemes illustrating possible implementations of a UE according to exemplifying embodiments.

Below, an exemplifying UE 600, configured to enable the performance of an above described method for handling separate aperiodic CSI reports for one or more static subframes, in which the direction of signal transmission is fixed, and one or more flexible subframes, in which the direction of signal transmission is flexible, will be described with reference to FIG. 6. The UE 600 is configured to be operable in a wireless communication network and can thus be assumed to be operable e.g. to communicate with a radio node serving the UE and to perform measurements related to radio signals. The part of the UE 600 which is most affected by the adaptation to the herein described method is illustrated as an arrangement 601, surrounded by a dashed line. The UE 600 and arrangement 601 are further configured to communicate with other entities via a communication unit 602 comprising means for wireless communication. The UE 600 or arrangement 601 may be assumed to comprise further functionality 606, for carrying out regular UE functions.

The arrangement part of the UE may be implemented and/or described as follows:

The arrangement 601 comprises processing means 603, such as a processor, and a memory 604 for storing instructions, the memory comprising instructions, e.g. computer program 605, which when executed by the processing means causes the UE 600 or arrangement 601 to receive a trigger for an aperiodic CSI report as part of an UL grant, from a radio node, in a static DL subframe. The trigger indicates a CSI subframe set, out of at least two alternative CSI subframe sets. The execution of the instructions further causes the UE 600 or arrangement 601 to perform an aperiodic CSI measurement for a CSI reference resource in the indicated CSI subframe set, and to report a result of the CSI measurement to the radio node, where one of the at least two alternative CSI subframe sets relates to the one or more static subframes, and another one of the at least two alternative CSI subframe sets relates to the one or more flexible subframes, as previously described. The UE 600 or arrangement 601 may be configured to report the result of the CSI measurement to the radio node in a CSI reporting subframe n.

Figure 7:
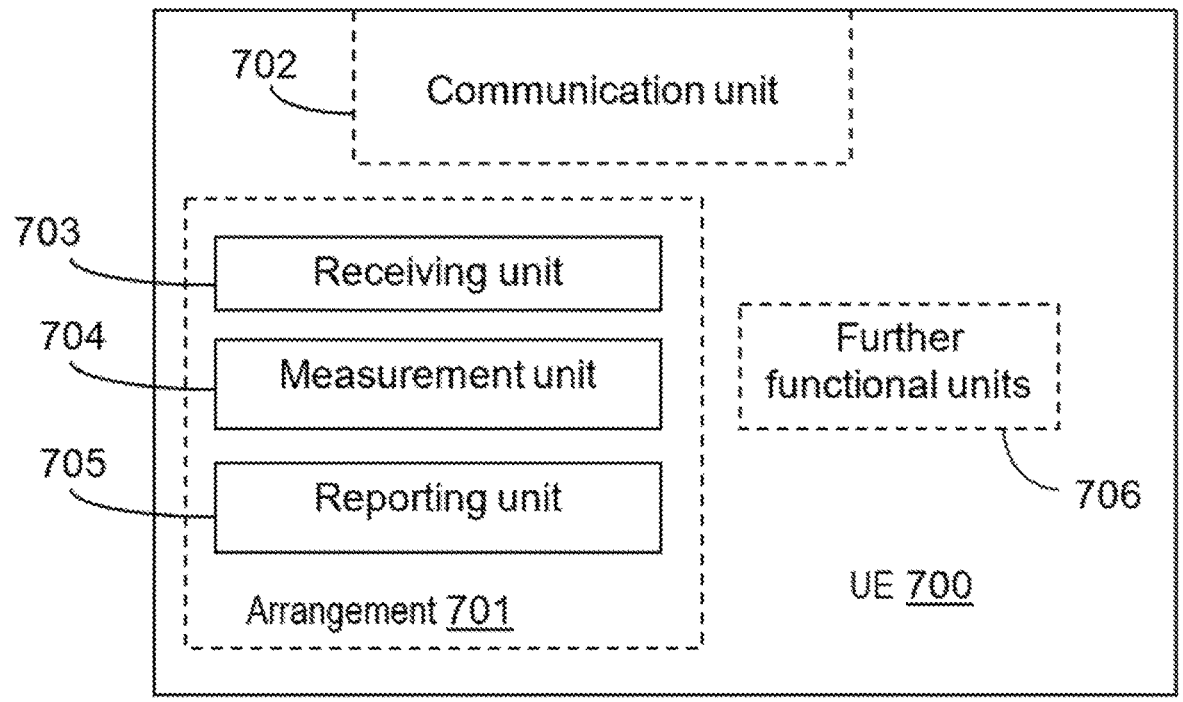

An alternative embodiment of the UE 600 is shown in FIG. 7. FIG. 7 illustrates a UE 700, operable in a wireless communication network. The part of the UE 700 which is most affected by the adaptation to the herein described method is illustrated as an arrangement 701, surrounded by a dashed line. The UE 700 or arrangement 701 comprises a communication unit 702 configured to communicate with other entities in wireless communication. The UE 700 or arrangement 701 may further be assumed to comprise further functional units 706, for carrying out regular UE functions.

The UE 700 or arrangement 701 comprises a receiving unit 703, configured to receive a trigger for an aperiodic CSI report as part of an UL grant, from a radio node, in a static DL subframe. The trigger indicates a CSI subframe set, out of at least two alternative CSI subframe sets.

The UE 700 or arrangement 701 further comprises a measurement unit 704, configured to perform an aperiodic CSI measurement for a CSI reference resource in the indicated CSI subframe set. The UE further comprises a reporting unit 705, configured to report a result of the CSI measurement to the radio node. The reporting unit 705 may be configured to report the result of the CSI measurement to the radio node in a CSI reporting subframe n.

Radio Node, e.g. BS

Embodiments described herein also relate to a radio node, or BS, operable in a wireless communication system. The radio node is configured to perform at least one embodiment of the method performed by a radio node described above. The radio node is associated with the same technical features, objects and advantages as the method described above and illustrated e.g. in FIG. 5.

Figure 8:
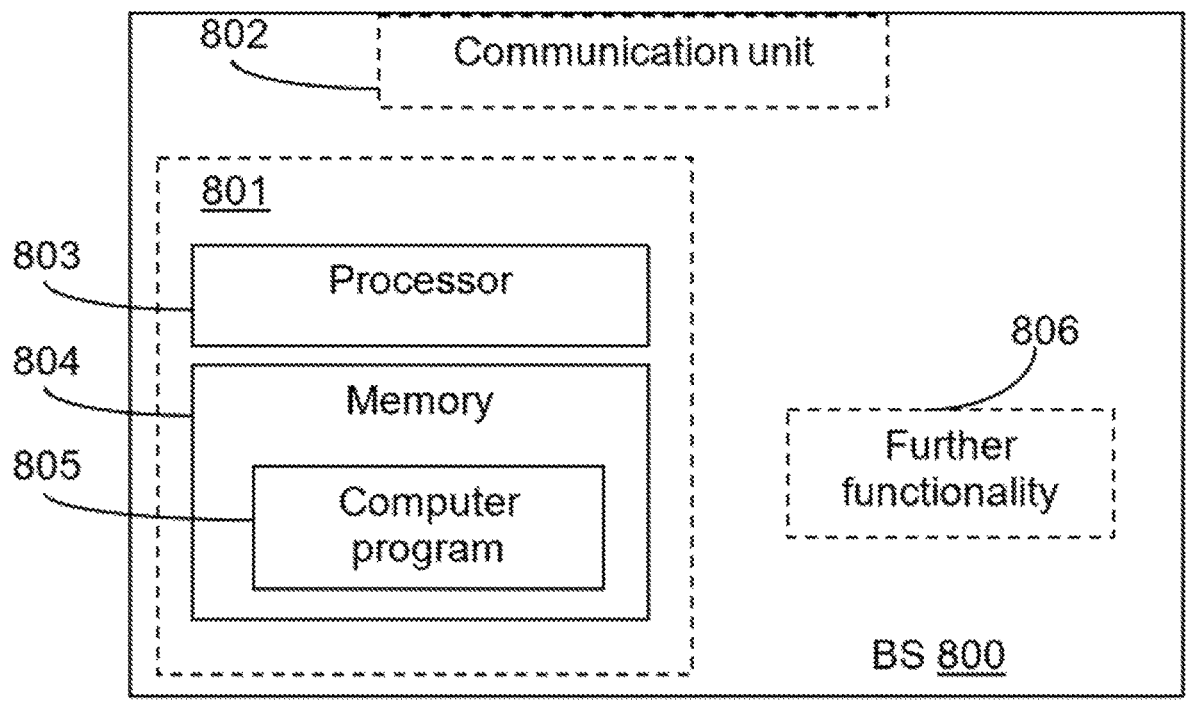
FIGS. 8 and 9 are block schemes illustrating possible implementations of a radio node according to exemplifying embodiments.

Below, an exemplifying radio node 800, configured to enable the performance of an above described method for handling separate aperiodic CSI reports for one or more static subframes, in which the direction of signal transmission is fixed, and one or more flexible subframes, in which the direction of signal transmission is flexible, will be described with reference to FIG. 8. The radio node 800 is configured to be operable in a wireless communication network. The part of the radio node 800 which is most affected by the adaptation to the herein described method is illustrated as an arrangement 801, surrounded by a dashed line. The radio node 800 and arrangement 801 are configured to communicate with other entities, such as UEs and MME via a communication unit 802 comprising means for wireless communication and possibly means for wired communication. The radio node 800 or arrangement 801 may be assumed to comprise other further functionality 806, for carrying out regular radio node functions, such as scheduling.

The arrangement part of the radio node 800 may be implemented and/or described as follows:

The arrangement 801 comprises processing means 803, such as a processor, and a memory 804 for storing instructions, the memory comprising instructions, e.g. computer program 805 which when executed by the processing means causes the radio node 800 or arrangement 801 to indicate to a UE, in an UL grant in a static DL subframe, a CSI subframe set, out of at least two alternative CSI subframe sets, in or upon which the UE should perform an aperiodic CSI measurement for a CSI reference resource, where one of the at least two alternative CSI subframe sets relates to the one or more static subframes, and another one of the at least two alternative CSI subframe sets relates to the one or more flexible subframes. The execution of the instructions further causes the radio node 800 or arrangement 801 to receive a CSI report from the UE comprising a result of the aperiodic CSI measurement in the indicated CSI subframe set. The radio node 800 or arrangement 801 may be configured to receive the CSI report from the UE in a CSI reporting subframe n.

Figure 9:
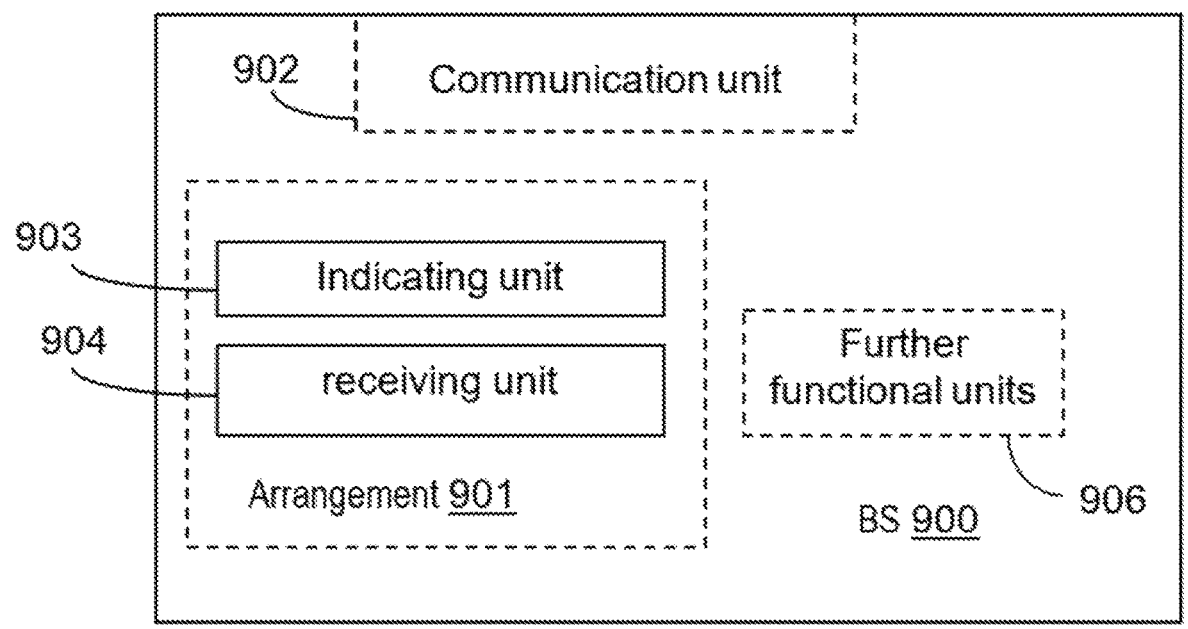

An alternative embodiment of the radio node 800 is shown in FIG. 9. FIG. 9 illustrates a radio node 900, operable in a wireless communication network. The part of the radio node 900 which is most affected by the adaptation to the herein described method is illustrated as an arrangement 901, surrounded by a dashed line. The radio node 900 or arrangement 901 comprises a communication unit 902 configured to communicate with other entities in wireless communication and possibly also in wired communication. The radio node 900 or arrangement 901 may further be assumed to comprise further functional units 906, for carrying out regular radio node functions, such as scheduling.

The radio node 900 or arrangement 901 comprises an indicating unit 903 configured to indicate to a UE, in an UL grant in a static DL subframe, a CSI subframe set, out of at least two alternative CSI subframe sets, in or upon which the UE should perform an aperiodic CSI measurement for a CSI reference resource, where one of the at least two alternative CSI subframe sets relates to the one or more static subframes, and another one of the at least two alternative CSI subframe sets relates to the one or more flexible subframes. The radio node 900 or arrangement 901 further comprises a receiving unit 904, configured to receive a CSI report from the UE comprising a result of the aperiodic CSI measurement in the indicated CSI subframe set. The radio node 900 or arrangement 901 may be configured to receive the CSI report from the UE in a CSI reporting subframe n.

Figure 5:
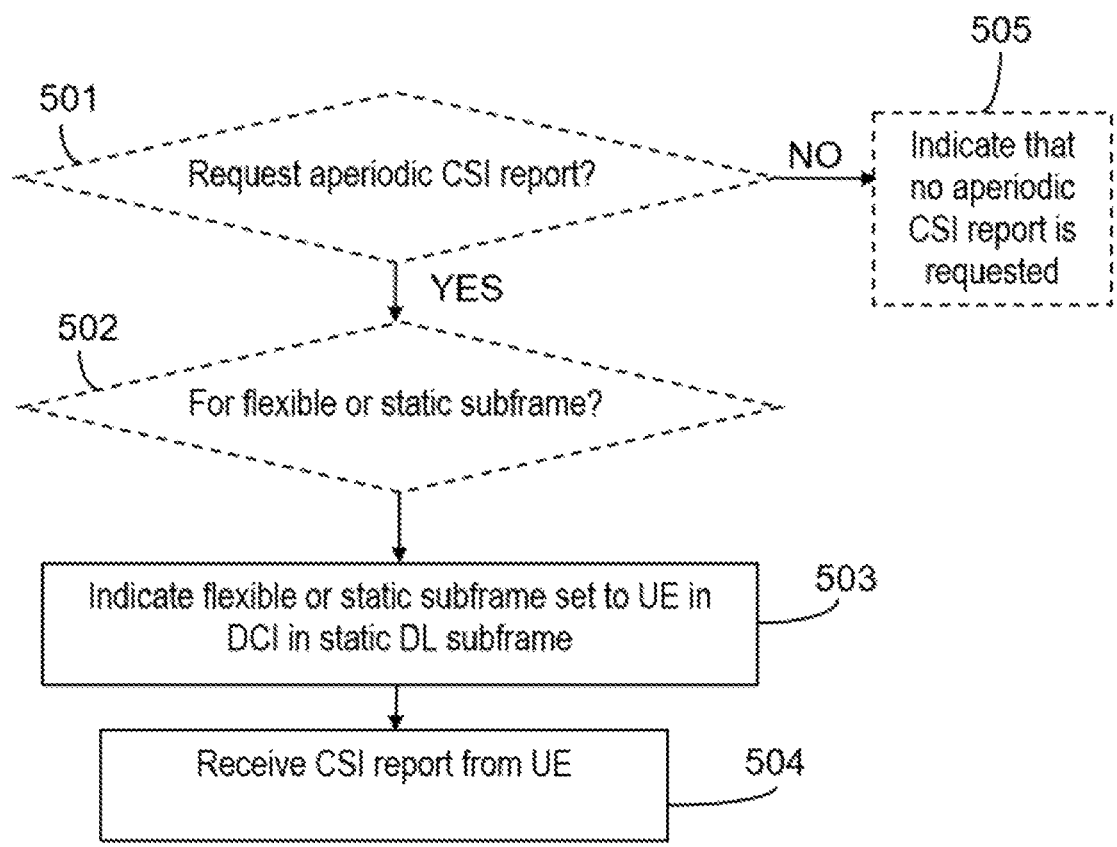
FIG. 5 is a flowchart illustrating a method to be performed by a radio node according to an exemplifying embodiment.

The units or modules in the arrangements in the different nodes described above could be implemented e.g. by one or more of: a processor or a micro processor and adequate software and memory for storing thereof, a Programmable Logic Device (PLD) or other electronic component(s) or processing circuitry configured to perform the actions described above, and illustrated e.g. in FIGS. 4-5. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The indications or triggers described herein can thus be seen as an aperiodic CSI report request, which term is also used herein. Furthermore, in this disclosure the above terms "a static/flexible subframe" are not limited to just one static/flexible subframe but should be interpreted as at least one static/flexible subframe.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions. While the solution has been described with reference to specific exemplary embodiments, the description is generally only intended to illustrate the inventive concept and should not be taken as limiting the scope of the solution. For example, the terms "radio node", "User Equipment, UE", "static subframe", "flexible subframe", "trigger", "CSI report" and "CSI measurement" have been used throughout this description, although any other corresponding entities, functions, and/or parameters could also be used having the features and characteristics described here.

It should also be noted that the units described in this disclosure are to be regarded as logical entities and not with necessity as separate physical entities.

ABBREVIATIONS

3GPP Third Generation Partnership Project
CCE Control Channel Element
CoMP Coordinated MultiPoint
CQI Channel Quality Indicator
CSI Channel State Information
DCI Downlink Control Information
DL Downlink
DM RS Demodulation Reference Signal
eNB evolved Node B
(E)PDCCH Enhanced PDCCH
HARQ Hybrid Automatic Repeat Request
ICIC Inter-Cell Interference Coordination
ID Identity
L1 Layer 1
LTE Long Term Evolution
MIMO Multiple Input Multiple Output
PDCCH Physical Downlink Control Channel
PUSCH Physical Uplink Shared Channel
Rel Release
RRM Radio Resource Management
RS Reference Symbol
TDD Time Division Duplex
UE User Equipment
UL Uplink Below, in an appendix, some alternative solutions to the triggering of aperiodic CSI will be mentioned.

APPENDIX

An alternative to the explicit signaling or triggering, which is the focus of this disclosure, could be implicit triggering. For implicit triggering, the aperiodic CSI request can be differentiated for static or flexible downlink subframes according to any of the following criteria:

The aperiodic CSI report request is carried over uplink grant for static or flexible uplink subframes; (explained in Embodiment 1 below)
  The CCE index of the uplink grant which carries the aperiodic CSI report request; (explained in Embodiment 2 below)
  The downlink subframe over which the uplink grant carrying aperiodic CSI report request is transmitted is special downlink subframe or not; (explained in Embodiment 3 below)
  The index of the downlink subframe over which the uplink grant carrying aperiodic CSI report request is transmitted; (explained in Embodiment 4 below)
  The HARQ process ID corresponding to the uplink grant carrying aperiodic CSI report request; (explained in Embodiment 5 below)
  The CSI process ID in the uplink grant carrying aperiodic CSI report request. (explained in Embodiment 6 below)

The above-mentioned criteria will be described in more detail as different embodiments below. In order to realize these embodiments, a radio node or base station is configured to transmit a first trigger for a UE to perform aperiodic CSI reporting for a static subframe, and to transmit a second trigger for a UE to perform aperiodic CSI reporting for a flexible subframe, just as in the case of explicit triggering described previously in this disclosure.

Embodiment 1: The Aperiodic CSI Report Request is Carried Over Uplink Grant for Static or Flexible Uplink Subframes In this embodiment, when a UE receives an uplink grant or a Random Access Response grant with a respective CSI request field set to trigger a report, the UE is triggered to perform aperiodic CSI reporting based on whether the UL grant or the Random Access Response grant schedules PUSCH transmission in the static subframe or flexible subframes. This may be realized according to different possibilities:

If the uplink grant or Random Access Response grant schedules a PUSCH transmission in the static uplink subframe, the aperiodic CSI reporting should involve a CSI measurement in one or more static downlink subframes. This scheduling thus corresponds to the first trigger.
  If the uplink grant or Random Access Response grant schedules a PUSCH transmission in the flexible subframe, the aperiodic CSI reporting should involve a CSI measurement in one or more flexible subframes. This scheduling thus corresponds to the second trigger.
  If the uplink grant schedules PUSCH transmissions in both static and flexible subframes, e.g. UL/DL configuration 0, the aperiodic CSI reporting should involve CSI measurements in both static and flexible subframes. This scheduling thus corresponds to both of the first and second triggers.

Embodiment 2: The CCE Index of the Uplink Grant which Carries the Aperiodic CSI Report Request In this embodiment, a metric can be defined as a function of the index of the first CCE of the uplink grant which carries the aperiodic CSI report request. This metric is denoted $\gamma_{cce}$. In that case, the UE determines to report the CSI for the static or flexible downlink subframes according to predefined rules depending on the metric.

As one example, $$\gamma_{cce} = \mathrm{mod}(Ind_{1st\_cce}/Agg_{pdcch}, 2)$$

Where $Ind_{1st\_cce}$ is the index of the first CCE, and $Agg_{pdcch}$ is the aggregation level of the UL grant carrying the CSI reporting trigger. In this embodiment, the UE is triggered to perform aperiodic CSI reporting for static and flexible downlink subframes when the metric $\gamma_{cce}$ is 0 and 1, respectively, or when the metric $\gamma_{cce}$ is 1 and 0, respectively.

Embodiment 3: The Downlink Subframe Over which the Uplink Grant Carrying Aperiodic CSI Report Request is Transmitted is a Special Downlink Subframe or not In this embodiment, it may be predefined/configured that a UE can determine the aperiodic CSI report for the static or flexible downlink subframes based on the subframe (which may be referred to as a CSI request carrying subframe) when the CSI report request received by the UE is a special subframe or not a special subframe.

In this embodiment, the UE may be triggered to perform aperiodic CSI reporting for the static and flexible downlink subframes when the CSI request carrying subframe is a special subframe and is not a special subframe, respectively, or when the CSI request carrying subframe is not a special subframe and is a special subframe, respectively.

Embodiment 4: The Index of the Downlink Subframe Over which the Uplink Grant Carrying Aperiodic CSI Report Request is Transmitted As a possibility in this embodiment, the downlink subframes (e.g. including special subframes) which can carry the uplink grant may be divided into two groups: $1^{st}$ downlink subframe group and $2^{nd}$ downlink subframe group. It may be predefined that aperiodic CSI report request carrying over the downlink subframe belonging to the $1^{st}$ or $2^{nd}$ downlink subframe group triggers the UE to perform aperiodic CSI measurement for static or flexible downlink subframe, respectively.

As another possibility in this embodiment, another metric can be defined as a function of the subframe index of the CSI request carrying subframe. This metric is denoted $\gamma_{sub-fn}$. It may be predefined/configured by the network that the UE can determine the aperiodic CSI report for the static or flexible downlink subframes according to predefined rules. As one example, the metric $\gamma_{sub-fn}$ may be defined as:

$$\gamma_{sub-fn} = \text{mod}(\text{subFn}, 2)$$

Where subFn is the subframe number or index. In this embodiment, the UE may be triggered to perform aperiodic CSI reporting for static and flexible downlink subframes when $\gamma_{sub-fn}$ is 0 and 1, respectively, or when $\gamma_{sub-fn}$ is 1 and 0, respectively.

Embodiment 5: The HARQ Process ID Corresponding to the Uplink Grant Carrying Aperiodic CSI Report Request As a possibility in this embodiment, the HARQ process IDs can be divided into two groups (1st and 2nd). The HARQ process ID corresponding to the uplink grant carrying aperiodic CSI report request belonging to the 1st/2nd HARQ process ID group means that the UE should perform the aperiodic CSI report for static/flexible downlink subframes respectively or vice versa.

As another possibility in this embodiment, a metric can be defined as a function of the HARQ process ID corresponding to the uplink grant carrying the aperiodic CSI report request, and the UE can determine to perform the aperiodic CSI report for static or flexible downlink subframes according to the predefined rules. As one example, a metric $\gamma_{hp}$ may be defined as:

$$\gamma_{hp} = \text{mod}(hp\_Id, 2)$$

Where hp_Id is the HARQ process identity. In this embodiment, the UE is triggered to perform aperiodic CSI reporting for static and flexible downlink subframes when $\gamma_{hp}$ is 0 and 1, respectively, or when $\gamma_{hp}$ is 1 and 0, respectively.

Embodiment 6: The CSI Process ID in the Uplink Grant Carrying Aperiodic CSI Report Request As a possibility in this embodiment, the CSI process IDs can be associated with static/flexible downlink subframes. In an example of the embodiment, two sets of CSI process IDs can be defined at the radio node or eNB. One set is associated with static downlink subframes, and the other set is associated with flexible downlink subframes. For the CSI process associated with static downlink subframes, the corresponding zero-power/non-zero power CSI RS and DM RS may be configured in static subframes only, while for the CSI process associated with flexible downlink subframes, the corresponding zero-power/non-zero power CSI RS and DM RS may be configured in flexible subframes only.

The invention claimed is:

1. A method performed by a User Equipment, UE, to handle separate aperiodic channel state information, CSI, reports for one or more static subframes, in which the direction of signal transmission is fixed, and one or more flexible subframes, in which the direction of signal transmission is variable, the method comprising:
    receiving a trigger for an aperiodic CSI report from a radio node;
    determining whether said trigger indicates a CSI subframe set related to the one or more static subframes or indicates a CSI subframe set related to the one or more flexible subframes;
    responsive to the trigger indicating the CSI subframe related to the one or more static subframes, reporting to the radio node, in a CSI reporting subframe, a result of an aperiodic CSI measurement for a CSI reference in the CSI subframe set related to the one or more static subframes; and
    responsive to the trigger indicating the CSI subframe related to the one or more flexible subframes, reporting to the radio node, in a CSI reporting subframe, a result of an aperiodic CSI measurement for a CSI reference in the CSI subframe set related to the one or more flexible subframes.

2. The method according to claim 1, wherein the trigger further indicates one or more CSI processes, the method further comprising:
    performing the aperiodic CSI measurement for the CSI reference resource in the CSI subframe set related to the one or more static subframes based on the one or more CSI processes responsive to the trigger indicating the CSI subframe related to the one or more static subframes; and
    performing the aperiodic CSI measurement for the CSI reference resource in the CSI subframe set related to the one or more flexible subframes based on the one or more CSI processes responsive to the trigger indicating the CSI subframe related to the one or more flexible subframes.

3. The method according to claim 2, wherein each CSI reference source is defined, in the time domain, as a single downlink subframe n-nCQI_ref, where nCQI_ref is an offset such that the single downlink subframe is a valid downlink subframe belonging to the CSI subframe set for the CSI reference source.

4. The method according to claim 1, further comprising:
    receiving a configuration change that changes at least one of the one or more flexible subframes.

5. The method according to claim 1, wherein the trigger is indicated by at least one bit, wherein the at least one bit indicates the trigger indicates a CSI subframe set related to the one or more static subframes when the at least one bit is set to a first value and indicates the trigger indicates a CSI subframe set related to the one or more flexible subframes when the at least one bit is set to a second value, the method further comprising decoding the at least one bit to determine whether the trigger indicates a CSI subframe set related to the one or more static subframes or indicates a CSI subframe set related to the one or more flexible subframes.

6. A non-transitory computer readable medium containing program code comprising instructions to be executed by at least one processor of a User Equipment, UE, to handle separate aperiodic channel state information, CSI, reports for one or more static subframes, in which the direction of signal transmission is fixed, and one or more flexible subframes, in which the direction of signal transmission is variable, whereby execution of the program code causes the at least one processor to perform operations comprising:
receiving a trigger for an aperiodic CSI report from a radio node;
determining whether said trigger indicates a CSI subframe set related to the one or more static subframes or indicates a CSI subframe set related to the one or more flexible subframes;
responsive to the trigger indicating the CSI subframe related to the one or more static subframes, reporting to the radio node, in a CSI reporting subframe, a result of an aperiodic CSI measurement for a CSI reference in the CSI subframe set related to the one or more static subframes; and
responsive to the trigger indicating the CSI subframe related to the one or more flexible subframes, reporting to the radio node, in a CSI reporting subframe, a result of an aperiodic CSI measurement for a CSI reference in the CSI subframe set related to the one or more flexible subframes.

7. The non-transitory computer readable medium according to claim 6, wherein the trigger further indicates one or more CSI processes, wherein the program code contains further instructions that when executed by the at least one processor causes the at least one processor to perform operations comprising:
performing the aperiodic CSI measurement for the CSI reference resource in the CSI subframe set related to the one or more static subframes based on the one or more CSI processes responsive to the trigger indicating the CSI subframe related to the one or more static subframes; and
performing the aperiodic CSI measurement for the CSI reference resource in the CSI subframe set related to the one or more flexible subframes based on the one or more CSI processes responsive to the trigger indicating the CSI subframe related to the one or more flexible subframes.

8. The non-transitory computer readable medium according to claim 7, wherein each CSI reference source is defined, in the time domain, as a single downlink subframe n-nCQI_ref, where nCQI_ref is an offset such that the single downlink subframe is a valid downlink subframe belonging to the CSI subframe set for the CSI reference source.

9. The non-transitory computer readable medium according to claim 6, wherein the program code contains further instructions that when executed by the at least one processor causes the at least one processor to perform operations comprising receiving a configuration change that changes at least one of the one or more flexible subframes.

10. The non-transitory computer readable medium according to claim 6, wherein the trigger is indicated by at least one bit, wherein the at least one bit indicates the trigger indicates a CSI subframe set related to the one or more static subframes when the at least one bit is set to a first value and indicates the trigger indicates a CSI subframe set related to the one or more flexible subframes when the at least one bit is set to a second value, the method further comprising decoding the at least one bit to determine whether the trigger indicates a CSI subframe set related to the one or more static subframes or indicates a CSI subframe set related to the one or more flexible subframes.

11. A User Equipment, UE, to handle separate aperiodic channel state information, CSI, reports for one or more static subframes, in which the direction of signal transmission is fixed, and one or more flexible subframes, in which the direction of signal transmission is variable, the UE comprising a processor, the processor configured to perform operations comprising:
receiving a trigger for an aperiodic CSI report from a radio node;
determining whether said trigger indicates a CSI subframe set related to the one or more static subframes or indicates a CSI subframe set related to the one or more flexible subframes;
responsive to the trigger indicating the CSI subframe related to the one or more static subframes, reporting to the radio node, in a CSI reporting subframe, a result of an aperiodic CSI measurement for a CSI reference in the CSI subframe set related to the one or more static subframes; and
responsive to the trigger indicating the CSI subframe related to the one or more flexible subframes, reporting to the radio node, in a CSI reporting subframe, a result of an aperiodic CSI measurement for a CSI reference in the CSI subframe set related to the one or more flexible subframes.

12. The User Equipment according to claim 11, wherein the trigger further indicates one or more CSI processes, wherein the processor performs further operations comprising:
performing the aperiodic CSI measurement for the CSI reference resource in the CSI subframe set related to the one or more static subframes based on the one or more CSI processes responsive to the trigger indicating the CSI subframe related to the one or more static subframes; and
performing the aperiodic CSI measurement for the CSI reference resource in the CSI subframe set related to the one or more flexible subframes based on the one or more CSI processes responsive to the trigger indicating the CSI subframe related to the one or more flexible subframes.

13. The User Equipment according to claim 12, wherein each CSI reference source is defined, in the time domain, as a single downlink subframe n-nCQI_ref, where nCQI_ref is an offset such that the single downlink subframe is a valid downlink subframe belonging to the CSI subframe set for the CSI reference source.

14. The User Equipment according to claim 11, wherein the processor performs further operations comprising receiving a configuration change that changes at least one of the one or more flexible subframes.

15. The User Equipment according to claim 11, wherein the trigger is indicated by at least one bit, wherein the at least one bit indicates the trigger indicates a CSI subframe set related to the one or more static subframes when the at least one bit is set to a first value and indicates the trigger indicates a CSI subframe set related to the one or more flexible subframes when the at least one bit is set to a second value, the method further comprising decoding the at least one bit to determine whether the trigger indicates a CSI subframe set related to the one or more static subframes or indicates a CSI subframe set related to the one or more flexible subframes.

16. A method performed by a radio node to handle separate aperiodic channel state information, CSI, reports for one or more static subframes, in which the direction of signal transmission is fixed, and one or more flexible subframes, in which the direction of signal transmission is variable, whereby execution of the program code causes the at least one processor to perform operations comprising:
  indicating to a User Equipment, UE, a CSI subframe set in which the UE should perform an aperiodic CSI measurement for a CSI reference resource, where the CSI subframe sets relates to the one or more static subframes or to the one or more status subframes;
  indicating a CSI subframe set related to the one or more static subframes by use of a first trigger and indicating a CSI subframe set related to the one or more flexible subframes by use of a second trigger, wherein the first trigger and the second trigger is indicated by at least one bit, wherein the at least one bit indicates the first trigger when the at least one bit is set to a first value and indicates the second trigger when the at least one bit is set to a second value; and
  receiving, in a CSI reporting subframe, an aperiodic CSI report from the UE comprising a result of the aperiodic CSI measurement for the CSI reference resource.

17. The method according to claim 16, wherein each CSI reference source is defined, in the time domain, as a single downlink subframe n-nCQI_ref, where nCQI_ref is an offset such that the single downlink subframe is a valid downlink subframe belonging to the CSI subframe set for the CSI reference source.

18. The method according to claim 16, further comprising indicating to the UE a configuration change that changes at least one of the one or more flexible subframes.

19. The method according to claim 18 wherein indicating to the UE the configuration change that changes at least one of the one or more flexible subframes comprises indicating to the UE the configuration change that changes at least one of the one or more flexible subframes responsive to a change in a traffic situation.

20. The method according to claim 16, further comprising determining whether there is a need for an aperiodic CSI report from the UE.

* * * * *

UNITED STATES PATENT AND TRADEMARK OFFICE
CERTIFICATE OF CORRECTION

PATENT NO. : 11,140,569 B2
APPLICATION NO. : 16/740616
DATED : October 5, 2021
INVENTOR(S) : Song et al.

It is certified that error appears in the above-identified patent and that said Letters Patent is hereby corrected as shown below:

On the Title Page

On Page 2, item (56), under "OTHER PUBLICATIONS", in Column 2, Line 18, delete "elMTA"," and insert -- eIMTA", --, therefor.

In the Specification

In Column 1, Line 8, delete "2019," and insert -- 2019, now Pat. No. 10,575,202, --, therefor.

Signed and Sealed this
Nineteenth Day of April, 2022

Katherine Kelly Vidal
*Director of the United States Patent and Trademark Office*